Oct. 14, 1958     H. MOORE     2,855,609

METHOD OF MAKING SLABBED LOCKING SETSCREWS

Filed Jan. 27, 1956

INVENTOR
HARRINGTON MOORE
by Wright, Brown, Quinby & May
ATTYS.

United States Patent Office 2,855,609
Patented Oct. 14, 1958

2,855,609

METHOD OF MAKING SLABBED LOCKING SETSCREWS

Harrington Moore, East Acton, Mass.

Application January 27, 1956, Serial No. 561,748

1 Claim. (Cl. 10—10)

This invention relates to a headless, frictionally locking setscrew having its driving end slabbed on two sides to receive a suitable wrench by which it can be turned. An object of the invention is to provide two parallel faces with a substantial thickness of metal between them so that a strong torque may be applied to the screw by means of a suitable wrench without breaking off the end of the screw. Another object of the invention is to provide elements near the driving end of the screw which project outward from the contour of the screw thread so as to engage frictionally the flanks of the interior thread in the hole into which the setscrew is driven.

In making such a screw, a piece of rod stock is screw threaded and cut off. One end is beveled and cupped, or otherwise shaped as desired. The other end is slabbed by two saw cuts which are simultaneously made in parallel planes equally spaced from the axis of the screw. The blades employed are as thin as practically possible so that a minimum quantity of metal will be removed from the screw by the slabbing operation. The saw blades are spaced inward from the flanks of the screw to form a fin at the outer side of each saw blade as the blades advance into the screw. A beveled disk is mounted next to the outer face of each saw blade to act as wedges to bend the fins outward. This increases the effective diameter of the screw at the driving end and provides for frictional engagement of the fins with the walls of threaded hole into which the screw is driven when put to use. The screw is turned by means of a suitable wrench having jaws with opposed parallel faces spaced to engage the slabbed faces of the screw.

For a more complete understanding of the invention reference may be had to the following description thereof and to the drawing, of which—

Figure 1:
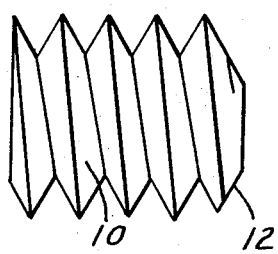
Figure 1 is a side elevation of a partly made headless screw.

A piece of rod stock may be screw threaded and cut off in the usual manner to form a partly finished headless screw 10 with one end beveled at 12 as shown in Figure 1. The beveled end is also cupped as at 14 to form the customary sharp circular edge on the entering end of the screw.

Figure 4:
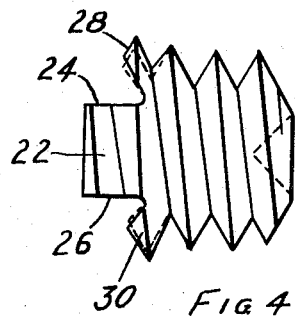
Figure 4 is a side elevation of a finished screw embodying the invention.
Figure 2:
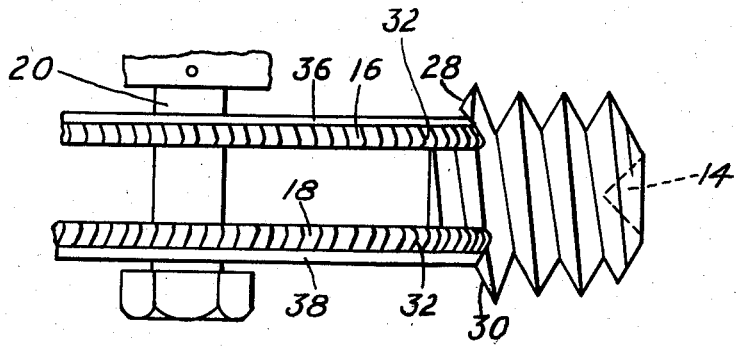
Figure 2 is a fragmentary plan view of a pair of saws slabbing a screw.
Figure 3:
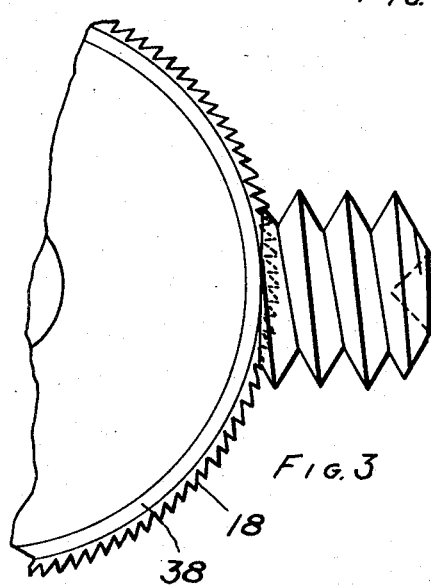
Figure 3 is a side elevation of the same.

According to the invention, the other end of the screw, which may be called the driving end, is operated on by a pair of parallel saw blades 16 and 18 mounted on a common shaft 20 which is driven by any suitable means (not shown). The saw blades are equally spaced from the axis of the screw as they cut axially into the driving end of the screw, forming an end lug 22 with parallel slabbed faces 24 and 26 which are equally spaced from the axis. The saw blades are spaced inward from the flanks of the screw sufficiently to form fins 28 and 30 as they penetrate into the screw. The profile of the saw teeth 32 when the blades are viewed tangentially is preferably somewhat rounded as indicated in Figure 2. Secured to the outer faces of the saw blades are beveled wedging disks 36, 38, making therewith a unitary tool. The diameter of these disks is substantially equal to the root diameter of the saw blades. As soon as the fins 28 and 30 are formed by the cutting operation of the saw blades 16 and 18 they are wedged outward by the beveled rim of the disks 36 and 38 from the positions indicated by broken lines in Figure 4 to the position shown in full lines. In the latter positions the fins diverge from the adjacent faces and project beyond the normal contour of the screw thread. Hence when the screw is driven into a threaded hole, the fins will be frictionally engaged and pressed inward by the walls of the hole when they enter the hole. This frictional locking engagement tends to hold the screw against reverse rotation.

Figure 5:
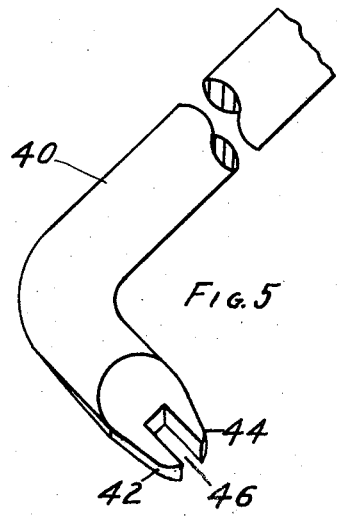
Figure 5 is a perspective view on a smaller scale, of a wrench for use on the slabbed screws.

To turn the screw a suitable tool such for example as the wrench shown in Figure 5 may be employed. This wrench consists of an L-shaped bar 40 having two terminal jaws 42 and 44 spaced by a notch 46 of the same width as the lug 22 which it receives when the wrench is used, the jaws having opposed parallel faces which engage the slabbed faces 24 and 26.

I claim:

The step in the method of making a headless, frictionally locking setscrew, which comprises making two saw cuts into an end of a screw in parallel planes equally spaced from the axis of the screw and spaced inward from the flanks of the screw whereby parallel slabbed faces are formed on the end portion of the screw with a fin adjacent to each said slabbed face, and wedging said fins outward simultaneously with the latter part of the cutting operation to cause said fins to diverge from said faces respectively, the cutting and wedging being performed by a single sawing and wedging tool.

References Cited in the file of this patent

UNITED STATES PATENTS

| | | |
|---|---|---|
| 672,884 | Bennett | Apr. 30, 1901 |
| 1,081,274 | Mueller et al. | Dec. 7, 1913 |
| 1,762,394 | Hosking | June 10, 1930 |
| 1,764,168 | Hosking | June 17, 1930 |